United States Patent [19]

Nose et al.

[11] Patent Number: 4,605,591
[45] Date of Patent: Aug. 12, 1986

[54] THERMOPLASTIC RESIN FILM LAMINATE AND PRODUCTION THEREOF

[75] Inventors: Katsuhiko Nose; Hajime Suzuki, both of Ohtsu; Osamu Makimura, Ohgaki, all of Japan

[73] Assignee: Toyo Boseki Kabushiki Kaisha, Osaka, Japan

[21] Appl. No.: 664,199

[22] Filed: Oct. 24, 1984

[30] Foreign Application Priority Data

Oct. 27, 1983 [JP] Japan .................................. 58-202015
Dec. 16, 1983 [JP] Japan .................................. 58-238358
Dec. 28, 1983 [JP] Japan .................................. 58-249947

[51] Int. Cl.$^4$ ........................ B32B 27/08; B32B 27/36
[52] U.S. Cl. ................................ 428/332; 427/412.5; 428/446; 428/480; 428/483
[58] Field of Search ............... 428/480, 483, 446, 332; 427/412.5

[56] References Cited

U.S. PATENT DOCUMENTS 4,476,189 10/1984 Posey et al. .................... 428/483 X Primary Examiner—Thomas J. Herbert

[57] ABSTRACT

A thermoplastic resin film laminate which comprises a thermoplastic resin film, particularly, a polyester film and a layer of a polyester resin composition provided on at least one surface of the film, said composition comprising (A) a water insoluble polyester copolymer composed of a mixed dicarboxylic acid component containing a dicarboxylic acid having metal sulfonate group in an amount of 0.5 to 15 mol % based on all the dicarboxylic acid component and a glycol component; and (B) inert particles; the weight ratio of (A)/(B)=100,000/0.5–3,000. Optionally, the composition can contain one or more ingredients selected from the group consisting of a water soluble silicone, a polyfunctional reactive compound, a polyethylene glycol and its derivative and an antistatic agent. The thermoplastic resin film laminate is preferably produced by so-called in-line coating.

12 Claims, No Drawings

THERMOPLASTIC RESIN FILM LAMINATE AND PRODUCTION THEREOF

FIELD OF THE INVENTION

The present invention relates to a thermoplastic resin film laminate and a process for the production thereof. More particularly, the laminate of the present invention has excellent slipperiness and transparency and further, depending upon the use thereof, it can exhibit excellent fabricability such as excellent adhesion, antistatic properties and the like without decreasing slipperiness and transparency.

BACKGROUND OF THE INVENTION

Synthetic thermoplastic resin films such as those of polyesters, polyamides, polypropylene and the like, particularly, polyester films, inter alia, polyethylene terephthalate films are useful in various fields such as electrical use, ornamental use, packaging materials, magnetic tapes and the like because they have excellent mechanical properties, electrical characteristics and dimensional stability. However, it has hitherto been well known that, when a friction coefficient of a thermoplastic resin film, particularly, a polyester film is high, slipperiness between the films becomes poor and, when slipperiness is extremely inferior, it causes blocking and makes not only handling of the film but also a film forming operation, particularly, winding of the film difficult. In order to lower a friction coefficient of the film, an inorganic or organic compound alone or a combination thereof is added to the film. However, when an amount of the compound is small, the effect thereof is hardly obtained. Therefore, the compound should be added to the film in a relatively large amount, which results in remarkable decrease of transparency of the film. That is, it has not been found heretofore in the prior art the film having a significantly lowered friction coefficient as well as good transparency as that of the film obtained without addition of such an compound. Further, when the same amount of the same compound is added to a polyester, the degree of lowering of a friction coefficient varies depending upon conditions of heat treatment. When, thermal history is higher, this degree of lowering of a friction coefficient becomes greater.

On the other hand, it has been proposed that a film having good slipperiness and good transparency can be obtained by adding an organic polysiloxane to a polyester film. According to this method, slipperiness of the film increases with increasing amount of an organic polysiloxane but, contrary to this, transparency of the film decreases and dimensional stability and mechanical properties such as Young's modulus, etc. tend to be inferior. Further, a method wherein knurl treatment is effected before winding a film has been also proposed. However, in fabrication of the film, the knurl treated part is cut off by a slit or remained only on one side. Thus, there are various problems in these conventional methods.

Further, common polyester films have high electrical insulation properties and therefore they have such drawbacks that they tend to generate and build up static electricity which cause various troubles due to static hindrance. For example, in film formation, printing, adhesion, bag making, packaging and other fabrication, static electricity causes lowering of operating efficiency (e.g., roll retention of the film, electric shock to the human body and difficulties in handling) and lowering of commercial value of end products (e.g., print having whisker and dirt on film surfaces). In general, as a method for preventing such a static hindrance, there is employed a treatment wherein an antistatic agent is incorporated into a resin to form a film or applied on a surface of a film. However, with respect to a polyester film, it is difficult to effect the former so-called incorporation type antistatic treatment. That is, in this treatment, an antistatic agent should ooze out from the inside to the surface of a film to show the antistatic effect, while, in case of a polyester film, once a film has been formed, an antistatic agent can not ooze out to the surface of the film at about room temperature because a polyester resin has a high second-order transition temperature. In addition, because of high film forming temperature conditions and high reactivity of a polar group contained in a polyester per se, there exist various problems in the addition of an antistatic agent such as deterioration of a polymer during film formation, coloring and lowering of physical properties. Particularly, in case of a biaxially oriented polyester film, the antistatic effect can be hardly expected because an antistatic agent on the surface of the film is scattered and lost during orientation. Further, most of antistatic agents cause remarkable decrease of transparency when they are added to a polyester film and they are difficult to use in practice.

In addition, it is very rare to use a biaxially oriented polyester film as it is in various uses and, usually, an appropriate surface treatment is provided to the film according to a particular use, for example, to improve adhesion between the film and a gelatin layer in case of using for a photographic film base, between the film and a magnetic layer in case of using for a magnetic tape base, between the film and a matting agent layer in case of using for a drafting base, between the film and a deposited metal in case of deposition of a metal, or between the film and an ink mainly composed of a nitrocellulose binder or a heat sealing agent in case of using for packaging. However, when a primer is used to improve adhesion, there is such a problem that, in general, a primer having good affinity for a biaxially oriented polyester film shows poor adhesion to a surface layer, while a primer having good affinity for the surface layer shows poor adhesion to the film. Further, as a method for improving adhesion properties of a surface of a polyester film, corona discharge treatment is generally employed and, in addition to this, a physical treatment such as ultraviolet-light irradiation treatment, plasma irradiation treatment, flame treatment, corona discharge treatment under nitrogen atmosphere or the like, a chemical treatment such as a treatment with an alkali, a primer or the like, or a combination thereof is known. However, it has not been found heretofore in the prior art a polyester film having good adhesion properties to both hydrophilic and hydrophobic polymers.

Under these circumstances, in order to obtain a thermoplastic resin film, particularly, a polyester film having excellent slipperiness and transparency and excellent other necessary properties such as antistatic properties and adhesion properties, the present inventors have intensively studied. As the result, it has been found that the desired thermoplastic film can be obtained by providing a layer of a polyester resin composition comprising a specific copolyester and inert particles and, optionally, one or more ingredients selected from the group consisting of a water soluble silicone, a polyfunctional reactive compound, a polyethylene glycol and its derivative and an antistatic agent to at least one surface of a thermoplastic resin film base, particularly, a polyester resin film base.

OBJECTS AND SUMMARY OF THE INVENTION

One object of the present invention is to provide a thermoplastic resin film laminate, particularly, a polyester film laminate having excellent slipperiness as well as excellent transparency.

Another object of the present invention is to provide a thermoplastic resin film laminate, particularly, a polyester film laminate having excellent slipperiness, excellent transparency as well as excellent antistatic properties.

Still another object of the present invention is to provide a thermoplastic resin film laminate, particularly, a polyester film laminate having excellent slipperiness, excellent transparency, excellent antistatic properties as well as excellent adhesion properties.

Still another object of the present invention is to provide a process for the production of the thermoplastic resin film laminate as mentioned above.

These objects as well as other objects and advantages of the present invention will become apparent to those skilled in the art from the following description.

According to the present invention there is provided a thermoplastic resin film laminate which comprises a thermoplastic resin film and a layer of a polyester resin composition provided on at least one surface of the film, said composition comprising
(A) a water insoluble polyester copolymer composed of a mixed dicarboxylic acid component containing a dicarboxylic acid having metal sulfonate group in an amount of 0.5 rto 15 mol % based on the entire dicarboxylic acid component and a glycol component; and
(B) inert particles;
the weight ratio of (A)/(B) being 100,000/0.5 to 3,000. Optionally, the composition can further contain one or more ingredients selected from the group consisting of a water soluble silicone, a polyfunctional reactive compound, a polyethylene glycol and its derivative and an antistatic agent. The thermoplastic resin film laminate of the present invention can be produced by various techniques. For example, the laminate can be produced by coextrusion of both the film and the layer, by extrusion of the layer on the film or by application of the layer on the film. Preferably, the laminate is produced by so-called inline coating, particularly, by applying an aqueous dispersion of a polyester resin comprising
(A) a water insoluble polyester copolymer composed of a mixed dicarboxylic acid component containing a dicarboxylic acid having metal sulfonate group in an amount of 0.5 to 15 mol % based on the entire dicarboxylic acid component and a glycol component;
(B) inert particles;
(C) a water soluble organic compound having an boiling point of 60° to 200° C.;
(D) water; and, optionally,
one or more ingredients selected from the group consisting of (E) a water soluble silicone, (F) a polyfunctional reactive compound, (G) a polyethylene glycol and its derivative and (H) an antistatic agent, the weight ratios of (A)/(B) being 100,000/0.5 to 3,000, (A)/(C) being 100/20 to 5,000 and (C)/(D) being 100/50 to 1,000, on at least one surface of a thermoplastic resin film to form a layer of a polyester resin composition thereon.

DETAILED DESCRIPTION OF THE INVENTION

The thermoplastic resin film employed in the present invention may be a conventional thermoplastic resin film and can be produced from thermoplastic resins such as polyesters, polyamides, polyolefins and the like, preferably, polyesters, particularly, polyethylene terephthalate according to a standard method. In case of a polyester film, it is preferable to use that containing a lubricant in an amount as small as possible, particularly, 300 ppm or less, in view of transparency.

The polyester copolymer (A) employed in the present invention is a substantially water insoluble polyester copolymer obtained by reacting a mixed dicarboxylic acid component composed of 0.5 to 15 mol % of a dicarboxylic acid having a metal sulfonate group and 85 to 99.5 mol % of a dicarboxylic acid having no metal sulfonate group, with a glycol component. The term "substantially water insoluble" means that the polyester copolymer is not dispersed in hot water, when it is stirred at 80° C. More specifically, it means the polyester copolymer which does not show a weight decrease of more than 5% even after stirring it in an excess amount of hot water at 80° C. for 24 hours.

Examples of the above dicarboxylic acid having a metal sulfonate group include metal salts of sulfoterephthalic acid, 5-sulfoisophthalic acid, 4-sulfophthalic acid, 4-sulfonaphthalene-2,7-dicarboxylic acid, 5-(4-sulfophenoxy)isophthalic acid and the like. 5-Sodium sulfoisophthalic acid and sodium sulfoterephthalic acid are particularly preferred.

The dicarboxylic acid component having a metal sulfonate group is incorporated in an amount of 0.5 to 15 mol % based on the weight of the entire dicarboxylic acid component. When the amount exceeds 15 mol %, the polyester copolymer shows remarkably decreased water resistance. On the other hand, when the amount is smaller than 0.5 mol %, the polyester copolymer shows remarkably decreased dispersion properties into inert particles.

As the dicarboxylic acid having no metal sulfonate group, there can be used aromatic, aliphatic or alicyclic dicarboxylic acids.

Examples of the aromatic dicarboxylic acid include terephthalic acid, isophthalic acid, orthophthalic acid, 2,6-naphthalenedicarboxylic acid and the like. The aromatic dicarboxylic acid is preferably incorporated in an amount of not less than 40 mol % based on the entire dicarboxylic acid component. When the amount is smaller than 40 mol %, the polyester copolymer shows decreased mechanical strength and water resistance.

Examples of the aliphatic and alicyclic dicarboxylic acids include succinic acid, adipic acid, sebacic acid, 1,3-cyclopentanedicarboxylic acid, 1,2-cyclohexanedicarboxylic acid, 1,3-cyclohexanedicarboxyric acid, 1,4-cyclohexanedicarboxylic acid and the like. When these non-aromatic dicarboxylic acids are incorporated, occasionally, improved adhesion characteristics are obtained, but, generally, the incorporation results in decreased mechanical strength and water resistance of the polyester copolymer.

As the glycol component which is reacted with the above mixed dicarboxylic acid component, there can be used aliphatic glycols having 2 to 8 carbon atoms or alicyclic glycols having 6 to 12 carbon atoms. Specific examples of the glycol include ethylene glycol, 1,2-propylene glycol, 1,3-propane diol, 1,4-butane diol, neopentyl glycol, 1,6-hexane diol, 1,2-cyclohexane dimethanol, 1,3-cyclohexane dimethanol, 1,4-cyclohexane dimethanol, p-xylylene glycol, diethylene glycol, triethylene glycol and the like. Further, as polyethers, there can be used polyethylene glycol, polypropylene glycol, polytetramethylene glycol and the like.

The polyester copolymer employed in the present invention can be produced by conventional melt polycondensation polymerization. For example, the polyester copolymer can be obtained by a direct esterification method wherein the above dicarboxlic acid component is directly reacted with the glycol component to distill off water to perform esterification, followed by polycondensation; or by an ester exchange method wherein a dimethyl ester of the above dicarboxylic acid component is reacted with the glycol component to distil off methyl alcohol to perform ester exchange, followed by polycondensation. Other methods such as solution polycondensation, interfacial polycondensation and the like can be also used, and the polycondensation method for the production of the present polyester copolymer is not limited to a specific one.

Examples of the inert particle (B) which is incorporated into the polyester resin composition include inorganic inert particles such as chalk, heavy calcium carbonate, calcium carbonate fine, basic magnesium carbonate, dolomite, special calcium carbonate, kaolin, calcined clay, pyrophyllite, bentonite, sericite, zeolite, talc, synthetic alminum silicate, synthetic calcium silicate, diatomaceous earth, anhydrous silicic acid fine powder, alminum hydroxide, barite, precipitated barium sulfate, natural gypsum, gypsum, calcium sulfite and the like; and organic inert particles such as crosslinked benzoguanamine resin and the like. Taking transparency and slipperiness into consideration, any inert particles may be used, but natural and synthetic silicic acids are preferred. The particle size is preferably from 0.01 to 10 microns. When the particle size is not more than 0.01 micron, it is necessary to use a very large amount of inert particles. On the other hand, when the particle size is not less than 10 microns, the resulting film laminate shows decreased slipperiness because of coarse projections of the particles.

Thus, it is preferable to use the ingredients (A) and (B) in the weight ratio (A)/(B) of 100,000/0.5 to 100,000/300, more preferably, 1,000/20 to 1,000/100.

In another aspect of the present invention, a silicone compound is further added to the polyester resin composition to further improve slipperiness and transparency.

The silicone compound used in the present invention is a water soluble silicone compound represented by the following general formula (I) or (II), or a mixture thereof, wherein the silicone compound has a molecular weight of 500 to 20,000 and contains not less than 60% by weight of the silicone component, the ratio of ethylene oxide/propylene oxide being in the relation of the following equation (III):

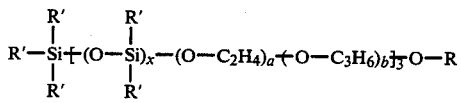

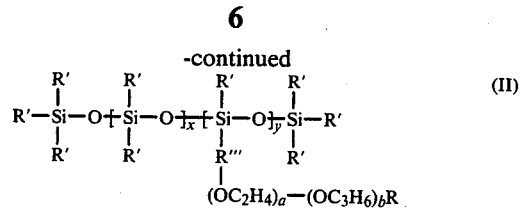

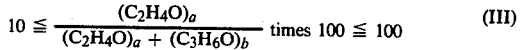

wherein R is hydrogen or lower alkyl having 1 to 4 carbon atoms, R' is lower alkyl having 1 to 4 carbon atoms, R" is hydrogen or lower alkyl, R''' is lower alkylene having 1 to 4 carbon atoms, x and a are each 0 or an integer of 1 or more and y and b are each an integer of 1 or more. When the molecular weight of the silicone compound is over 20,000, the silicone compound is in the form of a paste or a solid and shows low water solubility, which makes incorporation thereof into the polyester resin composition, for example, by adding it to an aqueous dispersion of the ingredients difficult and is undesirable from practical viewpoint. On the other hand, when the molecular weight is not more than 500, the compound shows good water solubility but it is liable to vapolize in fixation with heat, etc. and to volatilize during the production of the laminate film by, for example, extruding. With respect to the weight ratio of ethylene oxide and propylene oxide, when an amount of propylene oxide is increased and when, in the formula (III), an amount of ethylene oxide is less than 10 and the molecular weight becomes higher, the silicone compound shows low water solubility which makes incorporation thereof into an aqueous dispersion of the ingredient difficult. In addition, when the molecular weight is higher, the silicone compound shows poor compatibility to the polyester copolymer to decrease transparency.

Although, as silicone compounds, dimethyl polysiloxane, methyl hydrogen polysiloxane and the like are hitherto often used in order to improve slipperiness, such silicone compounds are not preferred because they show poor compatibilities to the polyester copolymer, which results in not only decrease of transparency, but also remarkable decrease of adhesion properties and printability. In order to improve slipperiness of the film while maintaining good compatibility with the polyester copolymer and without decreasing adhesion properties, it is also important that the amounts of the alkylene oxides should be balanced and the amount of the silicone component should not be over 60% by weight.

The silicone compound is preferably added in an amount of 0.05 to 10% by weight, more preferably, 0.1 to 5% by weight based on the weight of the polyester copolymer. When the amount is less than 0.05% by weight, the effect on improvement of slipperiness of the film is hardly realized and, on the other hand, when the amount is over 10% by weight, it induces plasticization of the polyester copolymer to produce somewhat tackiness to decrease slipperiness.

In still another aspect of the present invention, a polyfunctional reactive compound is further incorporated into the polyester resin composition to further improve slipperiness and transparency. Usually, the polyfunctional reactive compound contains within its molecule at least two functional groups such as epoxy, halohydrin, aziridinyl, isocyanate or Bunte salt thereof, blocked isocyanate, alkoxy, alkylol, vinylsulfone, vinylsulfone donor, acryloyl and reactive halogen.

Examples of the compound having epoxy group are ethylene glycol diglycidyl ether, triethylene glycol diglycidyl ether, polyethylene glycol diglycidyl ether, propylene glycol diglycidyl ether, polypropylene glycol diglycidyl ether, neopentyl glycol diglycidyl ether, 1,6-hexanediol diglycidyl ether, glycerol diglycidyl ether, trimethylolpropane triglycidyl ether, bisphenol A diglycidyl, hydrogenated bisphenol A diglycidyl ether, bisphenol A propylene oxide adduct diglycidyl ether and the like.

The compound having halohydrin group includes precursors of the above compounds.

Examples of the compound having alkylol or alkoxy group are dimethylolurea, methylated trimethylolmelamine, dimethylolethyleneurea, dimethylolalkyltriazone, methylated dimethyloluron, hexamethylolmelamine, dimethylolpropyleneurea, dimethylolhydroxyethyleneurea, tetramethylolacetylenediurea, 4-methoxy-5-dimethylpropyleneurea dimethylol adduct, dimethylolethylcarbamate and the like.

Examples of the compound having aziridinyl group are tris-2-methyl-triaziridinyl phosphine oxide and the like.

Examples of the compound having isocyanate group are tolylenediisocyanate, diphenylmethanediisocyanate, hexamethylenediisocyanate, triphenylmethanetriisocyanate, tris(p-isocyanatephenyl)thiophosphite, polymethylenepolyphenylisocyanate, isophoronediisocyanate, xylylenediisocyanate, trimethyolopropane having three moles of tolylenediisocyanate, blocked products thereof (e.g. products obtained by reacting the above isocyanate compounds with phenol, phenol derivatives, lactam and the like), bunte salts thereof (e.g. products obtained by reacting the above isocyanate compounds with sodium sulfite).

Examples of the compound having vinylsulfone group are sodium sulfite or pyridine adducts with divinylsulfone, dihydroxyethylsulfone and divinylsulfone.

Examples of the compound having acroyl group are 1,3,5-triacroylhexahydro-S-triazine and the like.

Examples of the compound having reactive halogen are dichlorotriazine, difluoromonochloropyrimidine, dichloroquinoxaline, dichloropyrimidine and the like.

However, the polyfunctional reactive compounds to be used in the present invention are not limited these compounds.

Although the amount of the polyfunctional reactive compound to be added varies depending on the kind thereof, the compound is preferably added in an amount of 1 to 40% by weight, more preferably 5 to 20% by weight based on the polyester copolymer. When the amount is less than 1% by weight, the effect on improvement of slipperiness due to cross linking is hardly realized and, on the other hand, when the amount is over 40% by weight, it decreases slipperiness of the polyester copolymer. These polyfunctional reactive compounds, of course, can be also used in a combination with the silicone compounds described above.

In still another aspect of the present invention, polyethylene glycol or its derivatives and/or an antistatic agent can be further added to the polyester resin composition to improve adhesion properties and antistatic properties without decreasing transparency and slipperiness.

As the polyethylene glycol or its derivatives, in general, there can be used that having a molecular weight of 1,000 to 50,000. Typical examples thereof are those represented by the following general formulas but are not limited thereto.

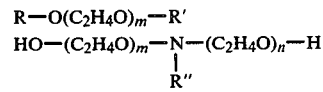

wherein R and R' are hydrogen, hydrocarbon group having 1 to 20 carbon atoms, epoxy or —COR''' (wherein R''' is hydrocarbon group having 1 to 20 carbon atoms); R'' is hydrocarbon group having 1 to 20 carbon atoms; and m and n are integers of 3 to 100. Preferably, each hydrocarbon group having 1 to 20 carbon atoms is alkyl or alkylaryl having 1 to 20 carbon atoms.

Suitable examples of the polyethylene glycol derivatives commonly used include those represented by the following formulas.

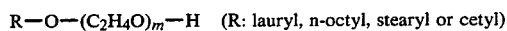

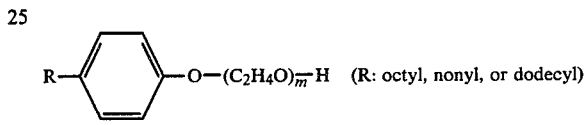

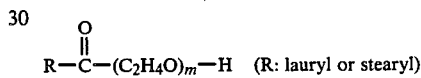

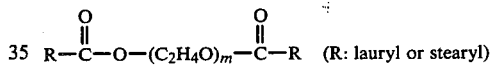

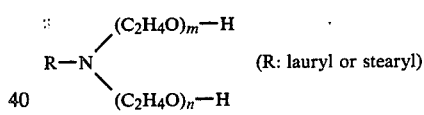

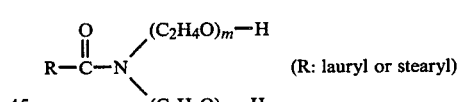

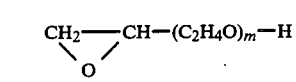

The other suitable examples of the polyethylene glycol derivative are graft products of polyethylene glycol and vinyl monomers represented by the following formulas in graft ratio of 5 to 300% based on the polyethylene glycol.

($R_1$: hydrogen or alkyl having 1 to 4 carbon atoms; $R_2$: alkyl having 1 to 8 carbon atoms)

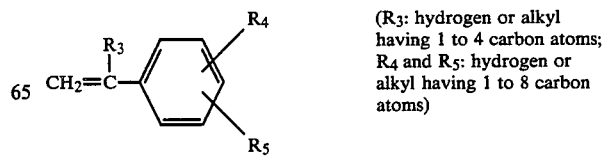

($R_3$: hydrogen or alkyl having 1 to 4 carbon atoms; $R_4$ and $R_5$: hydrogen or alkyl having 1 to 8 carbon atoms)

-continued

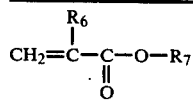
(R₆: hydrogen or alkyl having 1 to 4 carbon atoms; R₇: hydrogen, $-(CH_2)_n-OH$,
$-(CH_2)_n-OR_8$,
$-[(CH_2)_n-O\frac{1}{m}R_9$,
or $-CH_2-CH-CH_2$;
     \\  /
      O n and m: integer of 1 to 3; R₈ and R₉: alkyl having 1 to 4 carbon atoms)

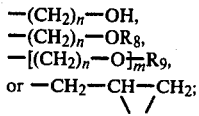
(R₁₀: hydrogen or alkyl having 1 to 4 carbon atoms; R₁₁ and R₁₂: Cl, —OH or alkoxy having 1 to 8 carbon atoms)

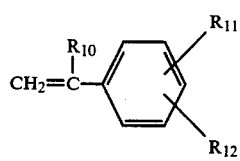
(R₁₃: hydrogen or alkyl having 1 to 4 carbon atoms; M: hydrogen, monovalent alkali metal or —NH₄)

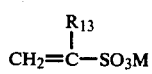
(R₁₄: hydrogen or alkyl having 1 to 4 carbon atoms)

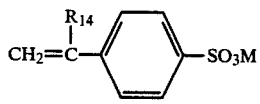

$CH_2=CHSO_3R_{15}$
(R₁₅: hydrogen or alkyl having 1 to 8 carbon atoms)

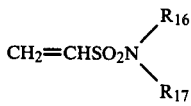
(R₁₆ and R₁₇: hydrogen or alkyl having 1 to 4 carbon atoms)

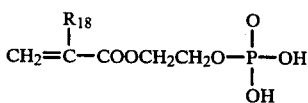
(R₁₈: hydrogen or alkyl having 1 to 4 carbon atoms)

The use of the graft polyethylene glycol is advantageous for producing the polyester laminate film of the present invention having good adhesion properties to both hydrophilic polymers such as PVA and hydrophobic polymers such as PVC.

The polyethylene glycol or its derivative is used in an amount of 1 to 20% based on the weight of the polyester copolymer.

Examples of the antistatic agent used in the present invention include anionic antistatic agents such as phosphoric acid derivatives (e.g., phosphate of higher alcohol or alkylphenol ethylene oxide adduct, other various phosphonic acids, phosphin, phosphite ester, etc.); sulfonic acid derivatives (e.g., Na salt or organic amine salt of higher alcohol sulfate, alkylphenol ethylene oxide adduct sulfate, alkyl sufonate, alkylarylsulfonate, etc.); and carboxylic acid derivatives (e.g., stearic acid sarcosinate sodium salt, sebacic acid triethanolamine salt, etc.). Preferred examples of the anionic antistatic agent are sulfone group containing compounds such as dodecylbenzenesulfonate sodium salt, octylsulfonate potassium salt, oligostyrenesulfonate sodium salt, dibutylnaphthalenesulfonate sodium salt, laurylsulfosuccinate sodium salt and the like.

As the antistatic agent, there can be also used a phosphate compound or an inorganic salt. Examples of the phosphate compound are monosodium phosphate, triammonium phosphate, dipotassium phosphate, sodium phosphite, sodium hypophosphite, ammonium hypophosphite, alminum phosphate, magnesium phosphate, potassium pyrophosphate, sodium pyrophosphate, potassium hexamethaphosphate, sodium tripolyphosphate, potassium tripolyphosphate and the like. Examples of the inorganic salt are thiocyanate salts such as ammonium, sodium, potassium, lithium, calcium, iron, barium and magnesium salts of thiocyanic acid and the like; halide salts such as sodium fluoride, potassium fluoride, sodium chloride, potassium chloride, calcium chloride, sodium bromide, potassium bromide, calcium bromide, sodium iodide, potassium iodide and the like. The phosphate compound or the inorganic salt can be used together with the anionic antistatic agent as described above.

The antistatic agent is added to the polyester resin composition in an amount of 0.1 to 15% by weight based on the weight of the polyester copolymer.

When the amount of the polyethylene glycol or its derivative and/or when the antistatic agent is too small, antistatic effect is hardly realized. On the other hand, when the amount is too large, it results in decrease of transparency, adhesion properties and antiblocking properties.

The lamination of the polyester resin composition to the film according to the present invention can be carried out by various methods, for example, by coextrusion of the composition and the raw material for the film from separate outlets of an extruder simultaneously, by extruding a melting sheet of the polyester resin composition onto the film to give a laminated layer, by coating an aqueous dispersion for the polyester resin composition onto the film and the like. Any method described above can be employed in the present invention, but in view of slipperiness and transparency of the product, it is preferable to coat an aqueous dispersion of the polyester resin composition because this permits formation of a thin layer on the film.

For preparing the aqueous dispersion of the polyester resin composition, it is necessary to disperse the polyester copolymer, the inert particles and the above described other ingredients into water together with water soluble organic compound as described hereinafter. For example, the dispersion can be prepared by previously admixing the above polyester copolymer, the inert particles, the above described other ingredient and the water soluble organic compound at 60° to 200° C. and then adding water to the resulting mixture or vice versa with stirring to form the dispersion or by stirring the polyester copolymer together with the water soluble organic compound and water at 40° to 120° C.

The water soluble organic compound used in the present invention is that having water solubility of 20 g per one liter of water at 20° C. Specifically, as the organic compound, there can be used are aliphatic and alicyclic alcohols, ethers, esters and ketones. Examples of the compound include monohydric alcohols such as methanol, ethanol, isopropanol, n-butanol and the like; glycols such as ethylene glycol, propylene glycol and the like; glycol derivatives such as methyl cellosolve, ethyl cellosolve, n-butyl cellosolve and the like; ethers such as dioxane, tetrahydrofuran and the like; esters such as ethyl acetate and the like; ketones such as methyl ethyl ketone and the like. The water soluble organic compound can be used alone or in a combination thereof. Among the above water soluble organic compounds, butyl cellosolve and ethyl cellosolve are preferred in view of dispersion characteristics into water and coating properties on the film.

It is important that the weight ratios of the polyester copolymer (A), the water soluble organic compound (C) and water (D) satisfy the following relations:

(A)/(C) is 100/20 to 5,000; and
(C)/(D) is 100/50 to 1,000.

When the ratio of water soluble organic compound to the polyester copolymer is small and (A)/(C) exceeds 100/20, dispersion properties of the aqueous dispersion are lowered. Although, in this case, a surface active agent can be added to improve dispersion properties, an excess amount of the surface active agent decreases adhesion properties and water resistance. On the other hand, when (A)/(C) is less than 100/5000 or when (C)/(D) is over 100/50, the amount of the water soluble organic compound in the aqueous dispersion is large and there is a danger of solvent retention after coating. Further, it is necessary to recover the organic compound because of expense. When (C)/(D) is less than 100/1,000, the aqueous dispersion tends to show decreased wetting to the film and form coating patches because its surface tension increases. In this case, although surface active agent can improve wetting properties, an excess amount of the surface active agent decreases adhesion properties and water resistance as described above.

The aqueous dispersion obtained as described above can be applied on an unoriented film, a uniaxially oriented film or a biaxially oriented film. However, when the film laminate which is oriented after coating the dispersion is compared with the film laminate which is not oriented after coating, the former is more preferred because of high adhesion properties and durability of the coat. Particularly, in the present invention, it is preferred to employ so-called inline coating wherein the aqueous dispersion is applied to an unoriented film or a uniaxially oriented film and then subjected to a further orientation.

In coating, the aqueous dispersion is applied on the film in such an amount that 0.01 to 5 g/m$^2$ of the polyester copolymer is present on the film. When the amount is less than 0.01 g/m$^2$, durability of the film laminate is decreased due to decrease of fixing capacity of the inert particles and, on the other hand, when the amount is over 5.0 g/m$^2$, it results in decreased slipperiness.

The thermoplastic resin film laminate thus obtained according to the present invention shows excellent transparency and slipperiness as well as excellent adhesion properties and antistatic properties.

Optionally, corona electric discharge treatment can be effected on the thermoplastic resin film prior to lamination of the polyester resin composition to improve adhesion between the film and the polyester resin composition layer. Further, optionally, after biaxially orientation, the polyester resin composition layer formed can be subjected to corona electric discharging treatment, corona electric dischaging treatment under nitrogen atmosphere, ultraviolet irradiation treatment and the like to improve wetting and adhesion properties of the film laminate.

In the present invention, it is preferable to use a polyester film as the thermoplastic resin film because scraps from the lamination step can be recovered and re-used. The thermoplastic resin film laminate obtained according to the present invention can be utilized, for example, as a base film for a magnetic tape, a label sticker and a chemical mat, a film for an overhead projector, a film for food packaging and the like.

The following examples and reference examples further illustrate the present invention in detail but are not to be construed to limit the scope thereof. In the examples and reference examples, all "parts" and "%'s" are by weight unless otherwise stated.

EXAMPLE 1

(1) Process for preparing transparent polyethylene terephthalate

Lead hydroxide PbO.Pb(OH)$_2$ (2.2 g, $0.95 \times 10^{-2}$ mole) was dissolved in ethylene glycol (200 ml) and to the solution was added GeO$_2$ (2.0 g, $1.9 \times 10^{-2}$ mole). The resulting mixture was heated under reflux at 197° C. which was the boiling point of ethylene glycol for about 30 minutes to provide a clear solution. Subsequently, polyethylene terephthalate was produced by using this solution as a polycondensation catalyst. Dimethyl terephthalate (620 parts), ethylene glycol (480 parts), zinc acetate Zn(OAc)$_2$.2H$_2$O (0.036 parts) as an ester exchange catalyst were charged in an ester exchange reactor and were subjected to an ester exchange reaction with gradual raising of temperature from 150° C. to 230° C. Methanol was distilled over 120 minutes. Then, to the contents transferred to a polycondensation reactor was added 2.7 parts of the above catalyst solution as a polycondensation catalyst and the pressure of the reaction system was gradually reduced with raising of temperature to 280° C. over one hour. The polycondensation reaction was carried out under highly reduced pressure of 0.5 mmHg for 25 minutes to give a polymer having an intrinsic viscosity of 0.63 and a melting point of 262° C.

(2) Process for preparing aqueous dispersion of polyester copolymer

A mixture of dimethyl terephthalate (117 parts, 49 mol %), dimethyl isophthalate (117 parts, 49 mol %), ethylene glycol (103 parts, 50 mol %), diethylene glycol (58 parts, 50 mol %), zinc acetate (0.08 part) and antimony trioxide (0.08 part) was subjected to an ester exchange reaction for 3 hours in a reactor with raising a of temperature from 40° to 220° C. Then, sodium 5-sulfoisophthalate (9 parts, 2 mol %) was added and the resulting mixture was subjected to an esterification reaction at 220° to 260° C. and further to a polycondensation reaction under reduced pressure (10 to 0.2 mmHg) for 2 hours to give a polyester copolymer having an average molecular weight of 18,000 and a softening point of 140° C. A mixture of the polyester copolymer (300 parts) and n-butyl cellosolve (140 parts) was stirred in a reactor at 150° to 170° C. for about 3 hours to give a homogeneous and viscous melt. Then, to the melt was slowly added water (560 parts) over about 1 hour to give an aqueous pale white homogeneous dispersion having a solids content of 30%. Further, to this dispersion was added Syloid 150 (SiO$_2$) in an amount of 500 ppm based on the polyester copolymer and then this admixture was diluted with water (4,500 parts) and ethanol (4,500 parts).

(3) Preparation of inline coat film laminate

Polyethylene terephthalate produced in (1) was subjected to a melt extrusion at 280° to 300° C. and was cooled by using a cooling roll at 15° C. to give an unoriented film of 1,000 microns in thickness. Then, the unoriented film was oriented in the lengthwise direction by 3.5 times between a pair of rolls at different peripheral speeds at 85° C. The above aqueous dispersion was applied on the film by air-knife technique. The film was dried with a hot air at 70° C. and then oriented in the crosswise direction by 3.5 times with a tenter at 98° C. Further, it was fixed with a hot air at 200° to 210° C. to give a biaxially oriented polyester film laminate of 100 microns in thickness.

EXAMPLES 2 AND 3

In the same manner as described in Example 1, each biaxially oriented polyester film laminate shown in Table 1 was prepared except that the amount of coating of the aqueous dispersion was varied as shown in Table 1 by controlling air pressure of air-knife coating.

EXAMPLES 4 AND 5

In the same manner as described in Example 1, each biaxially oriented polyester film laminate shown in Table 1 was prepared except that the amount of polyester copolymer was varied as shown in Table 1.

REFERENCE EXAMPLES 1 AND 2

In the same manner as described in Example 1, each polyester film laminate shown in Table 1 was prepared except that the polyester copolymer component of the aqueous dispersion was varied as shown in Table 1 to vary Tg.

REFERENCE EXAMPLES 3 TO 5

Each biaxially oriented polyester film laminate as shown in Table 1 was prepared in the same manner as described in Example 1 except that the amount of the inert particles, Syloid 150, was varied as shown in Table 1 or the particles were replaced with Syloid 620 ($SiO_2$) which had a larger particle size.

EXAMPLES 6 AND 7

Each biaxially oriented polyester film laminate as shown in Table 1 was prepared in the same manner as described in Example 1 except that the amount of Syloid 150 was varied within the claimed range.

REFERENCE EXAMPLE 6

A biaxially oriented polyester film laminate was prepared in the same manner as described in Example 1 except that Syloid 150 was not added to the aqueous dispersion.

REFERENCE EXAMPLE 7

A biaxially oriented polyester film was prepared in the same manner as described in Example 1 except that the coating of the aqueous dispersion was not carried out.

Conditions of these Examples and Reference Examples are summarized in Table 1. In Table 1, TPA is estimated in terms of terephthalic acid and SSI is estimated in terms of sodium 5-sulfoisophthalic acid. AA is adipic acid, EG is ethylene glycol, DEG is diethylene glycol and NPG is neopentyl glycol.

Further, haze, friction coefficient and blocking properties of each film laminate of these Examples and Reference Examples are shown in Table 2.

TABLE 1

| | Polyester Copolymer | | | | | | | Tg of Copolymer (°C.) | Inert Particles (ppm) | | Coating (g/cm$^2$) |
| | Dicarboxylic acid (mol %) | | | | Glycol (mol %) | | | | Syloid 150 2.5 microns | Syloid 620 20 microns | |
| | TPA | IPA | SSI | AA | EG | DEG | NPG | | | | |
| Ex. No | | | | | | | | | | | |
| 1 | 49 | 49 | 2 | — | 50 | 50 | — | 61 | 500 | — | 0.1 |
| 2 | 49 | 49 | 2 | — | 50 | 50 | — | 61 | 500 | — | 0.3 |
| 3 | 49 | 49 | 2 | — | 50 | 50 | — | 61 | 500 | — | 0.5 |
| 4 | 47 | 48 | 5 | — | 50 | — | 50 | 67 | 500 | — | 0.1 |
| 5 | 45 | 45 | 10 | — | 50 | — | 50 | 67 | 500 | — | 0.1 |
| 6 | 49 | 49 | 2 | — | 50 | 50 | — | 61 | 100 | — | 0.1 |
| 7 | 49 | 49 | 2 | — | — | — | — | 61 | 1000 | — | 0.1 |
| Ref. No | | | | | | | | | | | |
| 1 | 40 | 40 | 20 | — | 50 | 50 | — | 65 | 500 | — | 0.1 |
| 2 | 31 | 31 | 2 | 36 | 50 | 50 | — | 15 | 500 | — | 0.1 |
| 3 | 49 | 49 | 2 | — | 50 | 50 | — | 61 | 10 | — | 0.1 |
| 4 | 49 | 49 | 2 | — | 50 | 50 | — | 61 | 50000 | — | 0.1 |
| 5 | 49 | 49 | 2 | — | 50 | 50 | — | 61 | — | 500 | 0.1 |
| 6 | 49 | 49 | 2 | — | 50 | 50 | — | 61 | — | — | 0.1 |
| 7 | | | | | without coating of the aqueous dispersion | | | | | | |

TABLE 2

| | Haze (%) | Friction Coefficient | | Blocking Properties |
| | | kinetic | static | |
| Ex. No | | | | |
| 1 | 1.0 | 0.42 | 0.42 | o |
| 2 | 1.1 | 0.41 | 0.42 | o |
| 3 | 1.1 | 0.43 | 0.41 | o |
| 4 | 1.0 | 0.40 | 0.40 | o |
| 5 | 1.0 | 0.40 | 0.40 | o |
| 6 | 1.0 | 0.43 | 0.43 | o |
| 7 | 1.1 | 0.38 | 0.40 | o |
| Ref. No | | | | |
| 1 | 1.1 | 0.42 | 0.41 | Δ |
| 2 | 1.1 | 0.50 | 0.48 | x |
| 3 | 1.0 | ≧1.0 | ≧1.0 | o |
| 4 | 2.2 | 0.42 | 0.41 | o |
| 5 | 1.5 | 0.80 | 0.80 | o |
| 6 | 1.0 | ≧1.0 | ≧1.0 | o |
| 7 | 1.0 | ≧1.0 | ≧1.0 | o |

In Table 2, Haze was determined according to JIS-K-6714 by using a Haze Meter manufactured by NIPPON SEIMITSU KOGAKU Co. Ltd.

Friction coefficient was determined on both coated and uncoated surfaces of the film by using Tensilon manufactured by TOYO SEIKI Co. Ltd. according to ASTM-1894.

Blocking properties were determined as follows:

The coated surface of the film was stuck fast to the uncoated side and the film was cut into an 8×12 cm piece. The piece was then sandwiched between two silicon rubber sheets which were further sandwiched between two glass plates. Then, 2 kg of the load was applied on the film through the glass plate and the film was allowed to stand at 40° C. under 80% of RH for 24 hours. After that, the film was taken out and blocking properties thereof were estimated with the eye. The blocking properties were indicated according to the blocking area as follows: less than 5%: o; 5–20%:Δ; and more than 20%: x.

As is seen from Table 2, in the case of adding a larger amount of the inert inorganic particles, the film laminate shows inferior haze (Reference Example 4). In the case of using an extremely small amount of the inert particles (Reference Example 3), using particles having a large average particle size (Reference Example 5), coating an aqueous dispersion containing no inert particles (Reference Example 6) and having no layer of the polyester resin composition (Reference Example 7), the film laminates show decreased slipperiness. In addition, in the case of using the copolymer composed of adipic acid as the dicalboxylic acid and 20 mol % of sodium 5-sulfoisophthalate and having Tg of 15° C., the film laminate is liable to cause blocking.

Thus, it is clear that the film laminate of the present invention has excellent properties, while the polyester film laminates or the film in Reference Examples 1 to 7 can hardly be used for practical application.

EXAMPLE 8 AND 9

Each polyester film laminate was produced in the same manner as described in Example 1 except that the aqueous dispersion further contained 3% of a water soluble silicone of the formula (I) (molecular weight: 600; silicone component: 37%; ethylene oxide component: 100%) or 10% of trimethylol melamine (containing magnesium chloride in an amount of 3% based on trimethylol melamine) as shown in Tables 3 and 4. The resulting film laminates showed excellent slipperiness and transparency without blocking and had hazes of 1.0 and 1.0 and static friction coefficients of 0.37 and 0.34, respectively.

REFERENCE EXAMPLES 8 TO 10

Each polyester film laminate was produced in the same manner as described in Example 8 except that a silicon compound of the formula (I) having a molecular weight of 30,000 for Reference Example 8, that containing 70% of silicon component for Reference Example 9 or that containing 5% of ethyl oxide component for Reference Example 10 was used as shown in Table 3. The properties of the products are shown in Table 5. The hazes were 1.8, 2.0 and 2.2, respectively and the static friction coefficients were 0.37, 0.38 and 0.37, respectively. As is seen from the results, in the case of the film obtained by using the silicone having the very high molecular weight (Reference Example 8), by using the silicone containing silicone component of more than 60% (Reference Example 9) or by using the silicone containing ethylene oxide component of less than 10% the film shows inferior transparency.

REFERENCE EXAMPLE 11

A polyester film laminate was produced in the same manner as described in Example 8 except that a silicone compound was added in an amount of 20% based on the polyester copolymer. The results are shown in Table 5. The haze was 1.8 and the static friction coefficient was 0.90. It is clear that addition of a larger amount of the silicone is liable to cause blocking.

EXAMPLES 10 AND 11

Each polyester film laminate was produced in the same manner as described in Example 9 except that ethylene glycol glycidyl ether or 1,3,5-triacryloylhexanhydro-S-triazine was used instead of trimethylol melamine as shown in Table 4. The results are shown in Table 5. As is seen from the results, the film has excellent slipperiness and transparency without blocking.

REFERENCE EXAMPLES 12 AND 13

Each polyester film laminate was obtained in the same manner as described in Example 9 except that trimethylol melamine was added in the various amounts as shown in Table 4. The results are shown in Table 5. It is clear that, when the amount of trimethylol melamine is too large or too small, the friction coefficient is high.

TABLE 3

| | Aqueous Dispersion | | | | | | | | | |
|---|---|---|---|---|---|---|---|---|---|---|
| | Polyester Copolymer | | | | | Inert | Silicone Compound | | | |
| | Dicarboxylic (mol %) | | | Glycol (mol %) | | Particles Syloid 150 | Compound | Molecular | Silicone gredient | Ethylene Oxide | Addition Amount |
| | TPA | IPA | SSI | EG | DEG | 2.5 micron | No. | Weight | (wt %) | (wt %) | (%) |
| Ex. No | | | | | | | | | | | |
| 8 | 49 | 49 | 2 | 50 | 50 | 500 | (I) | 600 | 37 | 100 | 3 |
| Ref. No | | | | | | | | | | | |
| 8 | 49 | 49 | 2 | 50 | 50 | 500 | (I) | 30000 | 37 | 100 | 3 |
| 9 | 49 | 49 | 2 | 50 | 50 | 500 | (I) | 600 | 70 | 100 | 3 |
| 10 | 49 | 49 | 2 | 50 | 50 | 500 | (I) | 600 | 37 | 5 | 3 |
| 11 | 49 | 49 | 2 | 50 | 50 | 500 | (I) | 600 | 37 | 100 | 20 | same manner as described in Example 8 except that a

TABLE 4

| | Aqueous Dispersion | | | | | | | |
|---|---|---|---|---|---|---|---|---|
| | Polyester Copolymer | | | | | Inorganic Particles Syloid 150 | Polyfunctional reactant | |
| | Dicarboxylic Acid (mol %) | | | Glycol (mol %) | | | | Addition |
| | TPA | IPA | SSI | EG | DEG | 2.5 microns | Names | (wt %) |
| Ex. No | | | | | | | | |
| 9 | 49 | 49 | 2 | 50 | 50 | 500 | Trimethylol melamine | 10 |
| 10 | 49 | 49 | 2 | 50 | 50 | 500 | Ethylene glycol diglycidyl ether | 5 |
| 11 | 49 | 49 | 2 | 50 | 50 | 500 | 1,3,5-triacryloyl hexahydro-S— | 3 |

TABLE 4-continued

| | Aqueous Dispersion | | | | | | | |
|---|---|---|---|---|---|---|---|---|
| | Polyester Copolymer | | | | | Inorganic Particles Syloid 150 | Polyfunctional reactant | |
| | Dicarboxylic Acid (mol %) | | | Glycol (mol %) | | | | Addition |
| | TPA | IPA | SSI | EG | DEG | 2.5 microns | Names | (wt %) |
| Ref. No | | | | | | | triazine | |
| 12 | 49 | 49 | 2 | 50 | 50 | 500 | Trimethylol melamine | 0.5 |
| 13 | 49 | 49 | 2 | 50 | 50 | 500 | Trimethylol melamine | 50 |

TABLE 5

| | Haze (%) | Static Friction Coefficient | Blocking Properties |
|---|---|---|---|
| Ex. No | | | |
| 8 | 1.0 | 0.37 | o |
| 9 | 1.0 | 0.34 | o |
| 10 | 1.1 | 0.36 | o |
| 11 | 1.0 | 0.35 | o |
| Ref. No | | | |
| 8 | 1.8 | 0.37 | o |
| 9 | 2.0 | 0.38 | o |
| 10 | 2.2 | 0.37 | o |
| 11 | 1.8 | 0.90 | x |
| 12 | 1.0 | 0.46 | o |
| 13 | 1.1 | 0.51 | o |

EXAMPLE 12

A polyester film laminate was produced in the same manner as described in Example 1 except that 5% of polyethylene glycol (MW 20,000) and 1% of sodium dodecylbenzenesulfonate were further added to the aqueous dispersion containing Syloid 150 in an amount of 500 ppm based on the polyester copolymer as shown in Table 6. The results are shown in Table 7. As is seen from the results, the product shows excellent slipperiness and transparency as well as excellent adhesion properties and antistatic properties. The haze was 1.1, the static friction coefficient was 0.35, the grading of adhesion to polyvinyl alcohol, vinyl chloride copolymer and polymethyl methacrylate were 8, 10 and 10, respectively, and the surface resistance was $4.1 \times 10^9$ (ohm/cm).

REFERENCE EXAMPLES 14 AND 15

Each polyester film laminate was produced in the same manner as described in Example 12 except that either polyethylene glycol or sodium dodecylbenzenesulfonate was not added to the aqueous dispersion. From the results shown in Table 7, it is clear that the film without adding either polyethylene glycol or sodium dodecylbenzenesulfonate has inferior adhesion properties and inferior antistatic properties.

REFERENCE EXAMPLES 16 AND 17

Each polyester film laminate was produced in the same manner as described in Example 12 except that the amount of polyethylene glycol was out of the claimed range as shown in Table 6. It is clear from the result as shown in Table 7 that, when the amount of polyethylene glycol is too small, the film has inferior adhesion properties and, when the amount is too large, haze, slipperiness and adhesion properties become inferior and it is liable to cause blocking.

REFERENCE EXAMPLES 18 AND 19

Each polyester film laminate was produced in the same manner as described in Example 12 except that the amount of the antistatic agent was varied as shown in Table 6. As is seen from Table 7. it is clear that, when the amount of the antistatic agent is too small, the film has inferior antistatic properties and, when the amount is too large, haze and adhesion properties become inferior and it is laible to cause blocking.

TABLE 6

| | Aqueous Dispersion | | | | | | | |
|---|---|---|---|---|---|---|---|---|
| | Polyester Copolymer | | | | | Inert Particles | | Anionic antistatic agent (%) |
| | Dicarboxylic acid (mol %) | | | Glycol (mol %) | | Syloid 150 2.5 micron | PEG (%) | |
| | TPA | IPA | SSI | EG | DEG | | | |
| Ex. No | | | | | | | | |
| 12 | 49 | 49 | 2 | 50 | 50 | 500 | 5 | 1 |
| Ref. No | | | | | | | | |
| 14 | 49 | 49 | 2 | 50 | 50 | 500 | — | 1 |
| 15 | 49 | 49 | 2 | 50 | 50 | 500 | 5 | — |
| 16 | 49 | 49 | 2 | 50 | 50 | 500 | 0.08 | 1 |
| 17 | 49 | 49 | 2 | 50 | 50 | 500 | 30 | 1 |
| 18 | 49 | 49 | 2 | 50 | 50 | 500 | 5 | 0.01 |
| 19 | 49 | 49 | 2 | 50 | 50 | 500 | 5 | 15 |

TABLE 7

| | Haze (%) | Static Friction Coefficient | Blocking Property | Adhesion | | | Surface Resistance (ohm/cm) |
|---|---|---|---|---|---|---|---|
| | | | | 1 | 2 | 3 | |
| Ex. No | | | | | | | |
| 12 | 1.1 | 0.35 | o | 8 | 10 | 10 | $4.1 \times 10^9$ |
| Ref. No | | | | | | | |
| 14 | 1.2 | 0.38 | o | 3 | 7 | 6 | $5.7 \times 10^{10}$ |
| 15 | 1.1 | 0.39 | o | 5 | 10 | 10 | $1.0 \times 10^{13}$ |
| 16 | 1.3 | 0.36 | o | 3 | 7 | 7 | $4.2 \times 10^{10}$ |
| 17 | 2.6 | 0.80 | x | 5 | 7 | 6 | $2.3 \times 10^9$ |
| 18 | 1.3 | 0.42 | o | 5 | 10 | 10 | $7.2 \times 10^{13}$ |
| 19 | 2.9 | 0.39 | Δ | 3 | 6 | 4 | $1.0 \times 10^9$ |

The adhesion of the film was tested as follows:
A compatible red dye was added to (1) polyvinyl alcohol, (2) vinyl chloride-vinyl acetate copolymer or (3) polymethylmethacrylate and the resulting mixture was coated onto the film of 3 microns in thickness. On the coating layer was adhered a piece of Cello Tape (manufactured by NICHIBAN) and peeled off to make peel angle of 180° to test the adhesion of the film. The adhesion was graded as follows: without peeling: 10; half peeled off: 5; all peeled: 1.
Surface resistance of the film was tested by using a Specific Resistance Measuring Device manufactured by TAKEDA RIKEN Co. Ltd. at 500 V of applied voltage at 20° C. under 65% of RH.

What is claimed is:

1. A thermoplastic resin film laminate which comprises a thermolastic resin film and a layer of a polyester resin composition provided on at least one surface of the film, said composition consisting essentially of
   (A) a water-insoluble polyester copolymer of a mixed dicarboxylic acid component composed of 0.5 to 15 mole% of a dicarboxylic acid having a metal sulfonate group and 85 to 99.5 mole % of aromatic dicarboxylic acid having no metal sulfonate group reacted with a glycol component;
   (B) inert particles having an average particle size of 0.01 to 10 microns;
   the weight ratio of (A)/(B)=100,000/0.5–3,000.

2. A thermoplastic resin film laminate according to claim 1, wherein the composition further includes one or more ingredients selected from the group consisting of (E) a water soluble silicone, (F) a polyfunctional reactive compound, (G) polyethylene glycol and its derivatives and (H) an antistatic agent; said water soluble silicone (E) being represented by the following formula (I) or (II) or is a mixture thereof, the ratio of ethylene oxide and propylene oxide having the relation of the equation (III) and the molecular weight thereof being 500 to 20,000;

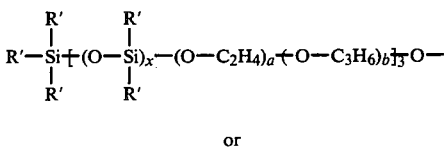

or

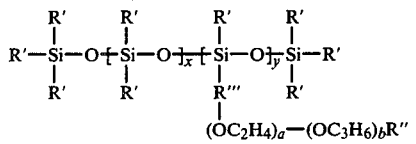

wherein R is hydrogen or lower alkyl having 1 to 4 carbon atoms, R' is lower alkyl having 1 to 4 carbon atoms, R" is hydrogen or lower alkyl, R'" is lower alkylene having 1 to 4 carbon atoms, x and a are each 0 or an integer of 1 or more and y and b are each an integer of 1 or more.

3. A thermoplastic resin film laminate according to claim 2, wherein the composition contains water soluble silicone (E) and the weight ratio of (A)/(E) is 100/0.05 to 10.

4. A thermoplastic resin film laminate according to claim 2, wherein the composition contains (F) a polyfunctional reactive compound and the weight ratio of (A)/(F) is 100/1 to 40.

5. A thermoplastic resin film laminate according to claim 2, wherein the composition contains (G) polyethylene glycol or its derivative and the weight ratio of (A)/(G) is 100/1 to 20.

6. A thermoplastic resin film laminate according to claim 2, wherein the composition contains (H) an antistatic agent and the weight ratio of (A)/(G) is 100/0.1 to 15.

7. A thermoplastic resin film laminate according to claim 1, wherein the thermoplastic resin film is a melt extruded, unoriented or uniaxially oriented film and the resulting laminate is further uiaxially or biaxially oriented.

8. A thermoplastic resin film laminate according to claim 7 wherein the melt extruded, unoriented or uniaxially oriented film contains a lubricant in an amount of 300 ppm or less.

9. A thermoplastic resin film laminate according to claim 1, wherein the thermoplastic resin film is a polyester film.

10. A thermoplastic resin film laminate according to claim 9, wherein the polyester film is a polyethylene terephthalate film.

11. A thermoplastic resin film lamiante according to claim 1, additionally containing water soluble silicone which is represented by the following formula (I) or (II) or is a mixture thereof, the ratio of ethylene oxide and propylene oxide having the relation of the equation (III) and the molecular weight thereof being 500 to 20,000;

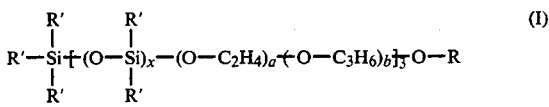

or

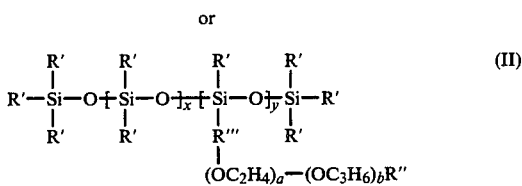

wherein R is hydrogen or lower alkyl having 1 to 4 carbon atoms, R' is lower alkyl having 1 to 4 carbon atoms, R" is hydrogen or lower alkyl, R'" is lower alkylene having 1 to 4 carbon atoms, x and a are each 0 or an integer of 1 or more and y and b are each an integer of 1 or more.

12. A process for the production of a thermoplastic resin film laminate which comprises applying an aqueous dispersion of a polyester resin composition on at least one surface of a thermoplastic resin film to form a layer of polyester resin composition thereon, said aqueous dispersion consisting essentially of
   (A) a water-insoluble polyester copolymer of a mixed dicarboxylic acid component composed of 0.5 to 15 mole % of a dicarboxylic acid having a metal sulfonate group and 85 to 99.5 mole % of aromatic dicarboxylic acid having no metal sulfonate group reacted with a glycol component;
   (B) inert particles having an average particle size of 0.01 to 10 microns;
   (C) a water soluble organic compound having a boiling point of 60°–200° C.; and
   (D) water;
   the weight ratios of (A)/(B)=100,000/0.5–3,000, of (A)/(C)=100/20–5,000 and of (C)/(D)=100/50–1,000.

* * * * *